United States Patent
Fang et al.

(10) Patent No.: US 9,030,997 B2
(45) Date of Patent: May 12, 2015

(54) LOAD-ADJUSTMENT FACTOR NOTIFICATION METHOD, DATA RATE CONTROL (DRC)-POINTING DETERMINATION METHOD, HANDOVER DETERMINATION METHOD AND DEVICES THEREOF

(75) Inventors: Yonggang Fang, Shenzhen (CN); Ting Lu, Shenzhen (CN); Yuanfang Yu, Shenzhen (CN); Xiaowu Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 137 days.

(21) Appl. No.: 13/497,684

(22) PCT Filed: Sep. 15, 2010

(86) PCT No.: PCT/CN2010/076966
§ 371 (c)(1),
(2), (4) Date: Mar. 22, 2012

(87) PCT Pub. No.: WO2011/035697
PCT Pub. Date: Mar. 31, 2011

(65) Prior Publication Data
US 2012/0176901 A1    Jul. 12, 2012

(30) Foreign Application Priority Data
Sep. 22, 2009  (CN) .......................... 2009 1 0093862

(51) Int. Cl.
H04Q 7/00      (2006.01)
H04Q 7/24      (2006.01)
H04W 36/22    (2009.01)

(52) U.S. Cl.
CPC .................................. *H04W 36/22* (2013.01)

(58) Field of Classification Search
USPC ......... 370/229–235, 254, 255, 328, 331, 332, 370/338
See application file for complete search history.

(56) References Cited

U.S. PATENT DOCUMENTS 8,208,398 B2 *  6/2012  Persson ......................... 370/252
8,379,558 B2 *  2/2013  Lohtia et al. .................. 370/312
(Continued)

FOREIGN PATENT DOCUMENTS

CN        1330502 A       1/2002
CN        1555665 A      12/2004
(Continued)

OTHER PUBLICATIONS

International Search Report for PCT/CN2010/076966 dated Nov. 18, 2010.

*Primary Examiner* — Hong Cho
(74) *Attorney, Agent, or Firm* — Ling and Yang Intellectual Property LLC (57) ABSTRACT

The present invention discloses a method for notifying a load-adjustment factor, including: a base station setting a load-adjustment factor of a sector and notifying a user terminal. The present invention also discloses a method for selecting and determining Data Rate Control (DRC) pointing, including: when selecting a sector which a DRC points towards, a user terminal calculating a difference value by deducting the received load-adjustment factor of the sector sent by a base station, from the measured signal measurement strength of the sector; the user terminal determining whether to point the DRC towards the sector according to the signal measurement strength resulted from the deduction. The present invention also discloses a method for determining sector handover.

10 Claims, 3 Drawing Sheets

(56) References Cited

U.S. PATENT DOCUMENTS

| | | | |
|---|---|---|---|
| 8,547,857 B2* | 10/2013 | Wu et al. | 370/252 |
| 2005/0193140 A1* | 9/2005 | Tiedemann et al. | 709/232 |
| 2007/0086387 A1* | 4/2007 | Kang et al. | 370/331 |
| 2007/0153687 A1* | 7/2007 | Attar et al. | 370/229 |
| 2008/0049675 A1* | 2/2008 | Burgan et al. | 370/331 |
| 2008/0125126 A1* | 5/2008 | Fang et al. | 455/436 |
| 2009/0213809 A1* | 8/2009 | Kwon et al. | 370/331 |
| 2009/0285159 A1* | 11/2009 | Rezaiifar et al. | 370/328 |

FOREIGN PATENT DOCUMENTS

| | | |
|---|---|---|
| CN | 1835632 A | 9/2006 |
| CN | 101114873 A | 1/2008 |
| CN | 101431787 A | 5/2009 |
| WO | 2009002241 A1 | 12/2008 |

* cited by examiner

LOAD-ADJUSTMENT FACTOR NOTIFICATION METHOD, DATA RATE CONTROL (DRC)-POINTING DETERMINATION METHOD, HANDOVER DETERMINATION METHOD AND DEVICES THEREOF

TECHNICAL FIELD

The present invention relates to the cell load control technology, and particularly to a method and an apparatus for notifying a load-adjustment factor in a Code Division Multiple Access (CDMA) system, a method and an apparatus for determining Data Rate Control (DRC) pointing, and a method and an apparatus for determining sector handover.

BACKGROUND OF THE RELATED ART

In a network utilizing the code division multiple access technology, a user terminal determines operations of DRC pointing and sector handover mainly depending on measuring the base station pilot channel strength.

Taking a CDMA High Rate Packet Data (HRPD) system as an example, when in a connected state, a user terminal needs to measure the pilot channel strength corresponding to each sector in a current active set, select a sector with the strongest signal and point the DRC to the sector, and a base station transmits data to the user terminal using the sector which the user terminal DRC points towards.

When in the connected state, the user terminal needs to measure the pilot channel strength corresponding to each neighbor cell, and makes determination and selection using a handover threshold, and reports the measured pilot strength of each neighbor cell to the base station by a routing update message, to demand handover-adding or handover-dropping a certain sector, and the base station completes the system resource updating and then sends a handover indication message to the user terminal so as to complete the final handover operation.

Moreover, during the process of evolution, the CDMA HRPD network may keep coexisting with a network utilizing other wireless access technology such as the Long Term Evolution (LTE) system network,. During the coexistence period, there will be interconnection and intercommunication between various networks. A multi-mode user terminal will also choose to monitor or directly try to switch into a sector in a different system by measuring a pilot strength of the different system and according to a certain handover strategy when in an idle state or a connected state.

It can be seen from the above description about the DRC pointing and handover determination that, when selecting the DRC pointing and a new sector that will be handover-added or handover-dropped, a user terminal will only be influenced by a pilot strength measurement result, but does not consider the practical load condition of the present base station system. On one hand, the user terminal points the DRC to a certain sector or requests to handover-add a certain sector, or can not hand-drop a certain sector at once, the system load in this sector may thus be further increased; on the other hand, the sector that the user terminal request to handover-add may reject these handover requests because of the limitation of the system capacity, or disestablishes the link of part of the present users, thus causing poor user experience.

SUMMARY OF THE INVENTION

In view of that, the main object of the present invention is to provide a method and an apparatus for notifying a load-adjustment factor, a method and an apparatus for selecting and determining DRC pointing based on the aforementioned the load-adjustment factor, and a method and an apparatus for determining handover of a sector, so as to enable the user terminal to avoid a handover and a DRC pointing towards a sector with a greater load.

In order to achieve the above object, the technical scheme of the present invention is implemented as follows:

A method for notifying a load-adjustment factor, comprising:

a base station setting a load-adjustment factor of a sector, and notifying a user terminal.

Preferably, the method comprises:

the station setting the load-adjustment factor according to current link load condition and/or system load condition of the sector.

Preferably, the method further comprises:

the base station obtaining a load-adjustment factor of a neighbor sector of a current serving sector of the user terminal, and notifying the user terminal.

Preferably, the step of notifying the user terminal comprises:

setting a dedicated message for the load-adjustment factor, and notifying the user terminal by a control channel or a specialized service channel.

Preferably, the step of notifying the user terminal comprises:

setting an information unit bearing the load-adjustment factor in an existing system message, and notifying the user terminal with the existing system message.

Preferably, the existing system message comprises a sector overhead (SectorParameter) message, a neighbor sector list (NeighborList) message or a different system neighbor sector information (OtherRATNeighborList) message.

Preferably, the step of the base station setting the load-adjustment factor according to a current link load condition and/or system load condition of the sector comprises:

the base station dynamically setting a value of the load-adjustment factor of the sector according to a difference value between a current link load and/or system load of the sector and a corresponding target load, wherein, the larger the difference value is, the greater the set load-adjustment factor is; or, once the current link load and/or system load exceeds the target load, setting a determined load-adjustment factor; wherein, when the current link load and system load are both lower than the target load, the load-adjustment factor is 0.

A method for selecting and determining pointing of a data rate control (DRC), comprising:

a user terminal, when selecting a sector towards which the DRC points, deducting a received load-adjustment factor of the sector distributed by a base station from a measured signal measurement strength of the sector; and the user terminal determining whether to point the DRC to the sector according to the signal measurement strength resulted from the deduction.

Preferably, the user terminal receives the load-adjustment factor of the sector by a dedicated message or an extended existing system message.

Preferably, the extended existing system message comprises: a SectorParameter message, a NeighborList message or an OtherRATNeighbroList message; an information unit bearing the load-adjustment factor is set in the SectorParameter message, the NeighborList message or the OtherRAT-NeighbroList message.

A method for determining sector handover, comprising:

a user terminal, when selecting whether to handover-add or handover-drop a sector, deducting a received load-adjustment factor of the sector distributed by a base station from a measured signal measurement strength of the sector or, adding a handover-add or handover-drop threshold used by the sector to the received load-adjustment factor of the sector distributed by the base station;

the user terminal determining whether to handover-add or handover-drop the sector according to the signal measurement strength resulted from the deduction, or determining whether to handover-add or handover-drop the sector according to the handover-add or handover-drop threshold resulted from the addition.

Preferably, the user terminal receives the load-adjustment factor of the sector by a dedicated message or a extended existing system message.

Preferably, the extended existing system message comprises: a SectorParameter message, a NeighborList message or an OtherRATNeighbroList message; an information unit bearing the load-adjustment factor is set in the SectorParameter message, the NeighborList message or the OtherRATNeighbroList message.

An apparatus for notifying a load-adjustment factor, comprising:

a setting unit, which is configured to set the load-adjustment factor of a sector; and a notifying unit, which is configured to notify a user terminal of the load- adjustment factor.

Preferably, the notifying unit comprises:

a setting sub-unit, which is configured to set a dedicated message of the load-adjustment factor or set an information unit for bearing the load-adjustment factor in an existing system message;

a bearing sub-unit, which is configured to make the dedicated message or the information unit of the existing system message bear the load-adjustment factor; and a sending sub-unit, which is configured to send to the user terminal the dedicated message or the existing system message that bears the load-adjustment factor.

Preferably, the notifying unit further comprises an obtaining sub-unit, which is configured to obtain load-adjustment factors of neighbor sectors of a current serving sector of the user terminal, and send the load-adjustment factors to the user terminal by the sending sub-unit.

Preferably, the setting unit, sets the load-adjustment factor according to a current link load condition and/or system load condition of the sector, which is specifically: the bases station dynamically setting a value of the load-adjustment factor of the sector according to a difference value between a current link load and/or system load of the sector and a corresponding target load, wherein, the larger the difference value is, the greater the set load-adjustment factor is; or, once the current link load and/or system load exceeds the target load, setting a determined load-adjustment factor; wherein, when the current link load and system load both are both lower than the target load, the load-adjustment factor is 0.

An apparatus for selecting and determining pointing of a data rate control (DRC), comprising:

a measuring unit, which is configured to measure a signal measurement strength of a sector when the user terminal is selecting and determining the pointing of the DRC;

a receiving unit, which configured to receive a load-adjustment factor of the sector distributed by a base station;

a calculating unit, which is configured to deduct the load-adjustment factor of the sector received by the receiving unit from the signal measurement strength of the sector measured by the measuring unit; and a DRC pointing selecting and determining unit, which is configure to determine whether the DRC points towards the sector according to the signal measurement strength resulted from the deduction performed by the calculating unit.

Preferably, the receiving unit is further configured to receive the load-adjustment factor of the sector by a dedicated message or an extended existing system message; the extended existing system message comprises: a SectorParameter message, a NeighborList message or an OtherRATNeighbroList message, and an information unit bearing the load-adjustment factor is set in the SectorParameter message, NeighborList message or the OtherRATNeighbroList message.

An apparatus for determining sector handover, comprising:

a measuring unit, which is configured to measure a signal measurement strength of a sector when a user terminal is determining sector handover;

a receiving unit, which is configured to receive a load-adjustment factor of the sector distributed by a base station;

a calculating unit, which is configured to deduct the load-adjustment factor of the sector received by the receiving unit from the signal measurement strength of the sector measured by the measuring unit, or add a handover-add or handover-drop threshold used by the sector to the load-adjustment factor of the sector received by the receiving unit; and a handover determining unit, which is configure to judge whether to handover-add or the handover-drop the sector according to the signal measurement strength resulted from the deduction or the handover-add or handover-drop threshold resulted from the addition performed by the calculating unit.

Preferably, the receiving unit is further configured to receive the load-adjustment factor of the sector by a dedicated message or an extended existing system message; the extended existing system message comprises: a SectorParameter message, a NeighborList message or an OtherRATNeighbroList message, and an information unit bearing the load-adjustment factor is set in the SectorParameter message, NeighborList message or the OtherRATNeighbroList message.

According to the present invention, a base station sets a load-adjustment factor of each sector according to the current load condition of each sector, and notifies the user terminal of the load-adjustment factor of the sector, to allow the user terminal, when determining sector handover or the sector towards which the DRC points, to take the currently measured signal strength resulted from deducting the load-adjustment factor as the determination of the handover and the DRC pointing, thereby avoiding the user terminal from switching to or the DRC from pointing to a greater sector, and avoiding the decrease of the communication quality of a user terminal in the sector with a greater load, thus improving the service quality of the CDMA system. The access protection of an overloaded sector is well implemented and the service quality of the whole communication system is improved according to the present invention.

PREFERRED EMBODIMENTS OF THE PRESENT INVENTION

The basic idea of the present invention is that: a base station sets a load-adjustment factor of each sector according to the current load condition of each sector, and notifies the user terminal of the load-adjustment factor of the sector, to allow the user terminal to take the currently measured signal strength resulted from deducting the load-adjustment factor as the determination of the handover and the DRC pointing, thereby avoiding the user terminal from switching to or the DRC from pointing to a greater sector, and avoiding the decrease of the communication quality of a user terminal in the sector with a greater load, thus improving the service quality of the CDMA system. The access protection of an overloaded sector is well implemented and the service quality of the whole communication system is improved according to the present invention.

In order to make the object, technical scheme and advantages of the present invention clearer, the present invention will be further described in detail taking embodiments as examples in combination with the drawings.

Figure 1:
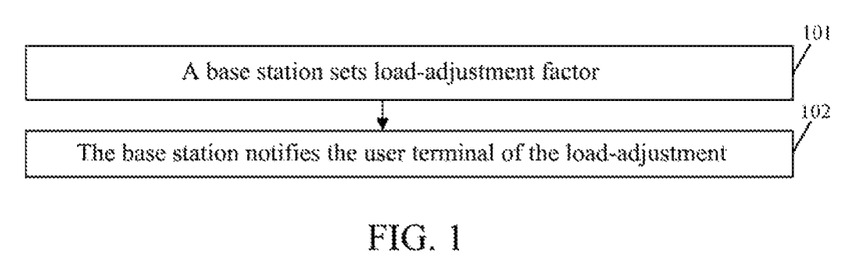
FIG. 1 is a flowchart of a method for notifying a load-adjustment factor according to the present invention.

FIG. 1 is a flowchart of a method for notifying a load-adjustment factor according to the present invention. As shown in FIG. 1, the method for notifying the load-adjustment factor according to the present invention comprises the following steps.

In step 101, a base station sets a load-adjustment factor.

Specifically, the base station sets a load-adjustment factor used to adjust the measured signal strength for a user terminal when determining accessing a sector, according to the present load condition of the sector. The present load condition comprises the link load condition and/or system load condition, and if the link load in the current sector reaches a designed maximum load, the sector is no longer an appropriate handover target of the user terminal, and also is not an appropriate sector to which the DRC of the user terminal points. While if the load condition of the whole system reaches the designed maximum load, the sectors of the whole system are no longer the appropriate handover target sectors or sectors to which the DRC points, the occurrence probability of which case is relatively small. In the present invention, the adjustment of the load factor will be mainly based on the link load condition of the sector, while the load condition of the system will be taken as a reference.

When a base station determines that the load of a certain sector exceeds a set target load, for example, exceeds a designed maximum load, the base station determines a load-adjustment factor for this sector. The load-adjustment factor according to the present invention is a signal strength value, whose unit may be power of signal or decibel (dB), depending on which the user terminal selects to represent the signal strength measurement value as regulated in the system. When the load of the sector does not exceed the set target load, the load-adjustment factor of the sector is 0. When the target load is far exceeded, a greater load-adjustment factor is set, for example, levels of the difference from the target load are set, and each difference level corresponds to a different load-adjustment factor. Or it may be implemented in the following way: regardless of the amount of the excess over the target load, one determined value is set (the load-adjustment factor is greater), to disable the user terminals that do not access the sector currently to access the sector, that is, once the target load is exceeded, the sector rejects access of any user terminal. The load-adjustment factor may be determined as the difference value between the maximum value of the signal strength reported by the present user terminal and a threshold signal strength allowing the user terminal to access the sector, or as any value greater than the difference value. The purpose of setting the load-adjustment factor is to avoid a new user terminal from accessing the sector even though the measurement signal strength of the user terminal reaches the threshold signal strength of access.

In step 102, the base station notifies the user terminal of the load-adjustment factor. Herein, it would be better that the user terminal is also notified of the load-adjustment factors of neighbor sectors of the serving sector of the user terminal together with the load-adjustment factor, so as to facilitate the user terminal to make determination on sector handover, the determination on the sector to which the DRC points, and the like.

According to the present invention, there are multiple ways to notify the user terminal of the load-adjustment factor of the user terminal serving sector and those of the neighbor sectors, for example, a dedicated message is set for the load-adjustment factor, and the user terminal obtains the load-adjustment factor by receiving the dedicated message, thereby performing the determination on sector handover, the determination on the sector to which the DRC points, and the like.

According to the present invention, the load-adjustment factor of a sector and those of the neighbor sectors can be borne in an existing system message by extending the existing system message, and then sent to the user terminal together with other information in the system message. The user terminal may obtain the load-adjustment factor by analyzing the information unit bearing the load-adjustment factor in the system message. How to bear the load-adjustment factor of the user terminal serving sector and those of the neighbor sectors in the system message according to the present invention will be described in detail below.

How to bear the load-adjustment factor of the user terminal serving sector and those of the neighbor sectors in the system message according to the present invention will be described in detail below.

Specifically, according to the present invention, the load-adjustment factors of the user terminal serving sector and neighbor sectors are written into a sector overhead (Sector-Parameter) message, a NeighborList message or a OtherRat-NeighborList message of the current system, which are then sent to the user terminal by a control channel or a specialized service channel, the user terminal receives said messages and deducts the above load-adjustment factor from the measured pilot strength measurement value of each sector to obtain a final relative pilot strength of each sector, and the user terminal will finally replace the measured pilot strength value of each sector with the relative pilot strength to perform the selection of system in an idle state and sector handover between same frequencies, different frequencies and different systems.

The SectorParameter message of overhead message protocol of the current HRPD system defines a sector parameter structure, and a load-adjustment factor reflecting the current load condition of the system is added into the sector parameter message according to the present invention. Specifically, the structure of the SectorParameters message is as shown in TABLE 1:

TABLE 1

| Field | Length (bits) |
|---|---|
| MessageID | 8 |
| ... | ... |
| ReverseChannelNumber | 0 or 11 |
| Reserved | 0 or 7 (as needed) |

An information unit is added to the SectorParameter message shown in TABLE 1 according to the present invention, to bear the load-adjustment factor. The structure of a new SectorParameter message is as shown in TABLE 2:

TABLE 2

| Field | Length (bits) |
|---|---|
| MessageID | 8 |
| ... | ... |
| ReverseChannelNumber | 0 or 11 |
| NeighborCount + 1 occurrence of the following two field: | |
| { | |
| LoadingAdjustIncluded | 1 |
| LoadingAdjust | 6 |
| } | |
| Reserved | 0 or 7 (as needed) |

In TABLE 2, LoadingAdjust represents that, if LoadingAdjustIncluded in the message is "1", the message should includes a field of the load-adjustment factor, which is set as a unsigned number with a unit of 0.5 dB. As shown in TABLE 2, LoadingAdjust has 6 bits, and the corresponding load-adjustment factor is product of LoadingAdjust and 0.5 dB.

It can be seen by comparing TABLE 1 with TABLE 2, the fields LoadingAdjustIncluded, LoadingAdjust are newly added in the initial SectorParameter message according to the present invention. Wherein the LoadingAdjust is set by the base station according to the current load condition of the network.

The NeighborList message of a routing updating protocol in the current HRPD system also defines a neighbor sector recording structure, and load-adjustment factors of the serving sector of the user terminal and neighbor sectors that reflect the current load condition of the system are added in the NeighborList message according to the present invention. Specifically, the structure of the NeighborList message is as shown in TABLE 3:

TABLE 3

| Field | Length (bits) |
|---|---|
| MessageID | 8 |
| ... | ... |
| FPDCHSupported | 0 or 1 |
| Reserved | 0 or 7 (as needed) |

The solution provided by the present invention allows a load-adjustment factor to be added in the above NeighborList message, and a structure of a new NeighborList massage is as shown in TABLE 4:

TABLE 4

| Field | Length (bits) |
|---|---|
| MessageID | 8 |
| ... | ... |
| FPDCHSupported | 0 or 1 |
| Count occurrences of the following field: | |
| { | |
| LoadingAdjustIncluded | 1 |
| LoadingAdjust | 6 |
| } | |
| Reserved | 0 or 7 (as needed) |

In TABLE 4, LoadignAdjust represents that, if LoadingAdjustIncluded in the message is "1", then the message includes this field, and the field of the load-adjustment factor is set as a unsigned number with a unit of 0.5 dB.

It can be seen by comparing TABLE 3 with TABLE 4 that, the fields LoadingAdjustIncluded, LoadingAdjust are newly added in the initial neighbor sector message according to the present invention. Wherein the LoadingAdjust is set by the base station according to the current load condition of the network.

A basic structure of NeighborList message of different systems is being defined in a current interoperation specification of a LTE system and a HRPD network. Specifically, the basic structure of the NeighborList message sent to the user terminal by the HRPD network is as shown in TABLE 5:

TABLE 5

| Field | Length (bits) |
|---|---|
| MessageID | 8 |
| NeighborRATListSignature | 3 |
| NumNeighborRAT | 4 |
| NumNeighborRAT occurrences of the following record: | |
| { | |
| NeighborRATType | 4 |
| NeighborRATRecordLength | 8 |
| NeighborRATRecord | 8 × NeighborRATRecord Length |
| } | | wherein the basic structure of neighbor sector record of the different system is as shown in TABLE 6:

TABLE 6

| Field | Length (bit) |
|---|---|
| PerChannelPriorityIncluded | 1 |
| ServingHRPDPriority | 1 or 3 |
| ... | ... |
| Reserved | 0 or 7 (as needed) |

The solution scheme provided by the present invention allows a load-adjustment factor field to be added in the above neighbor sector record of the different system, and the structure of the new neighbor sector record of the different system is as shown in TABLE 7:

TABLE 7

| Field | Length (bits) |
|---|---|
| PerChannelPriorityIncluded | 1 |
| ServingHRPDPriority | 1 or 3 |
| ... | ... |
| LoadingAdjustIncluded | 1 |
| LoadingAdjust | 6 |
| Reserved | 0 or 7 (as needed) | wherein, LoadingAdjustIncluded represents whether the LoadAdjust is included, a value of 1 represents including the LoadAdjust, and a value of 0 represents not including the LoadAdjust; the LoadAdjust represents that, if the LoadingAdjustIncluded in the massage is "1", then the field of LoadingAdjust is included, and the field of LoadingAdjust is an unsigned number with a unit of 0.5 dB.

It can be seen by comparing TABLE 6 with TABLE 7 that, the fields of LoadingAdjustIncluded, LoadingAdjust are newly added in the neighbor sector record of the initial different system according to the present invention. Wherein the LoadingAdjust is set by the base station according to the current load condition of the network.

By way of sending the above message bearing the load-adjustment factor, the user terminal may obtain the load-adjustment factor of the corresponding sector by analyzing the above message.

According to the present invention, a new dedicated message that is similar to the dedicated message in a message format as shown in TABLE 2, TABLE 4 and TABLE 7 may also be newly set. Of course, the new dedicated message may be has a structure as shown in TABLE 8:

TABLE 8

| Field | Length (bits) |
|---|---|
| MessageID | 8 |
| LoadingAdjust | 4 |
| NeighborCount | 5 |
| NeighborCount occurrences of the following record: { | |
| NeighborSectorLoadingAdjust | 4 |
| } | |
| Reserved | 0 or 7 (as needed) |

Figure 2:
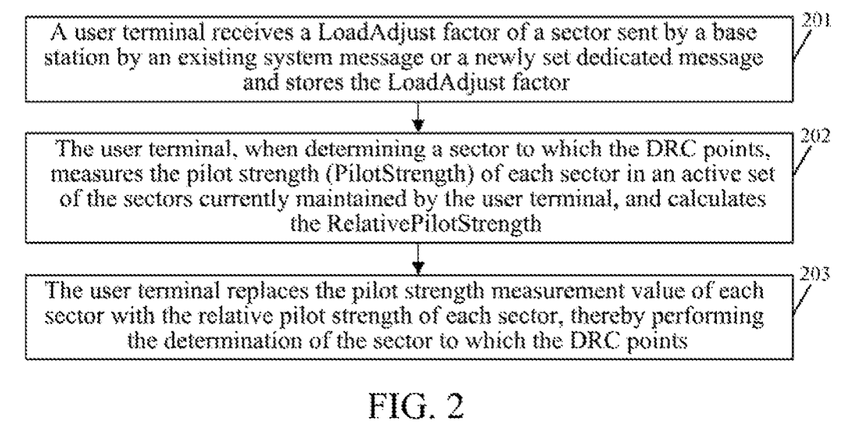
FIG. 2 is a flowchart of a method for selecting and determining pointing of a data rate control according to the present invention.

FIG. 2 is a flowchart of a method for selecting and determining pointing of a data rate control according to the present invention. As shown in FIG. 2, the method for selecting and determining pointing of the data rate control according to the present invention comprises the following steps.

In step 201, a user terminal receives a load-adjustment factor (LoadAdjust) of a sector sent by a base station by an existing system message or a newly set dedicated message and stores the LoadAdjust.

For the way of the existing system message bearing the load-adjustment factor, see the above TABLE 2, TABLE 4 and TABLE 7, which will not be repeated herein.

The newly set dedicated message may be designed using a message format similar to that shown in TABLE 2, TABLE 4 and TABLE 7, or using a structure as shown in TABLE 8.

In step 202, the user terminal, when determining a sector to which the DRC points, measures the pilot strength (PilotStrength) of each sector in an active set of the sectors currently maintained by the user terminal, and calculates the RelativePilotStrength using the following formula:

RelativePilotStrength=PilotStrength−LoadAdjust. That is, the load-adjustment factor of the sector is deducted from the currently measured pilot signal strength of the sector. The load-adjustment factor of each sector in the active set may be obtained by the above-mentioned existing system message and the load-adjustment factor of the neighbor sector in the dedicated message.

In step 203, the user terminal replaces the pilot strength measurement value of each sector with the relative pilot strength of each sector, thereby performing the determination of the sector to which the DRC points.

If the relative pilot strength exceeds a set threshold, then it is determined that the current DRC points towards the sector. The specific determining way belongs to the prior art, and thus will not be described herein.

Figure 3:
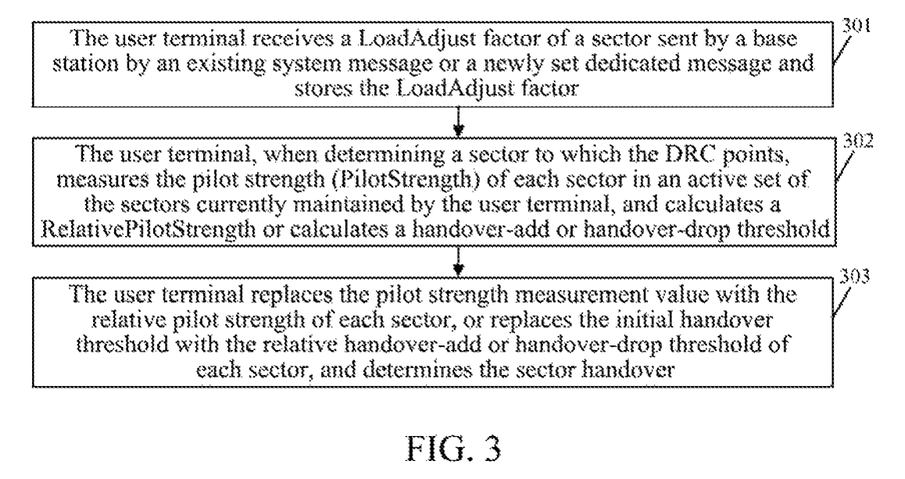
FIG. 3 is a flowchart of a method for determining sector handover according to the present invention.

FIG. 3 is a flowchart of a method for determining sector handover according to the present invention. As shown in FIG. 3, the method for determining sector handover according to the present invention comprises the following steps.

In step 301, the user terminal receives a load-adjustment factor (LoadAdjust) of a sector sent by a base station by an existing system message or a newly set dedicated message and stores the LoadAdjust.

For the way of the existing system message bearing the load-adjustment factor, see above said TABLE 2, TABLE 4 and TABLE 7, which will not be repeated herein. The newly set dedicated message may be designed using a message format similar to that shown in TABLE 2, TABLE 4 and TABLE 7, or using a structure as shown in TABLE 8.

In step 302, the user terminal, when determining a sector to which the DRC points, measures the pilot strength (PilotStrength) of each sector in an active set of the sectors currently maintained by the user terminal, and calculates the RelativePilotStrength using the following formula:

RelativePilotStrength=PilotStrength−LoadAdjust. That is, the load-adjustment factor of the sector is deducted from the currently measured pilot signal strength of sector. The load-adjustment factor of each sector in the active set may be obtained by the above-mentioned existing system message and the load-adjustment factor of the neighbor sector in the dedicated message.

Or the user terminal uses the following formulas to calculate a relative handover-add or handover-drop threshold:

RelativePilotAdd=PilotAdd+LoadingAdjust

RelativePilotDrop=PilotDrop+LoadingAdjust

That is, a handover-add or handover-drop threshold (PilotAdd and PilotDrop respectively) set by each sector is added to the load-adjustment factor of the sector. The load-adjustment factor of each sector in the active set may be obtained by the above-mentioned existing system massage and the load-adjustment factor of the neighbor sector in the dedicated message.

In step 303, the user terminal replaces the pilot strength measurement value with the relative pilot strength of each sector, or replaces the initial handover threshold with the relative handover-add or handover-drop threshold of each sector to determine whether to handover-add or handover-drop the sector.

If the relative pilot strength exceeds the set handover-add or hand-drop threshold, or an absolute pilot strength exceeds the relative handover-add or handover-drop threshold, then it is determined that the sector is handover-added or handover-dropped. The specific determining way belongs to the prior art and thus will not be repeated herein.

Figure 4:
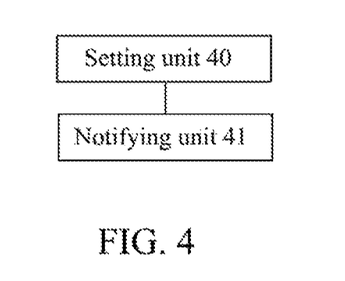
FIG. 4 is a schematic diagram of the structure of an apparatus for notifying a load-adjustment factor according to the present invention.

FIG. 4 is a schematic diagram of the structure of an apparatus for notifying a load-adjustment factor according to the present invention. As shown in FIG. 4, the apparatus for notifying a load-adjustment factor according to the present invention comprises a setting unit 40 and a notifying unit 41, wherein, the setting unit 40 is configured to set the load-adjustment factor of the sector; the notifying unit 41 is configured to notify the user terminal of the load-adjustment factor. Specifically, the setting unit 40 sets the load-adjustment factor according to the current link load condition and/or system load condition. The current load condition comprises the link load condition and/or system load condition, and if the link load in the current sector reaches a designed maximum load, the sector is no longer an appropriate handover target of the user terminal, and also is not an appropriate sector to which the DRC of the user terminal points. While if the load condition of the whole system reaches the designed maximum load, the sectors of the whole system are no longer appropriate handover target sectors or sectors to which the DRC points, the occurrence probability which case will be relatively small. In the present invention, the adjustment of the load factor will be mainly based on the link load condition of the sector, while the load condition of the system will be taken as a reference.

Figure 5:
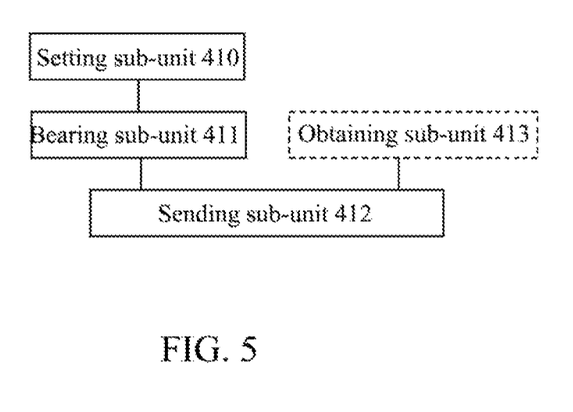
FIG. 5 is a schematic diagram of the structure of a notifying unit according to the present invention.

FIG. 5 is a schematic diagram of the structure of a notifying unit according to the present invention. As shown in FIG. 5, the notifying unit 41 of the present invention comprises a setting sub-unit 410, a bearing sub-unit 411 and a sending sub-unit 412, wherein, the setting sub-unit 410 is configured to set a dedicated message of the load-adjustment factor or set an information unit for bearing the load-adjustment factor in an existing system; the bearing sub-unit 411 is configured to make the dedicated message or the information unit of the existing system message bear the load-adjustment factor; the sending sub-unit 412 is configured to send the dedicated message or the existing system message that bears the load-adjustment factor to the user terminal. The bearing sub-unit bears the load-adjustment factor of the sector and those of the neighbor sectors by the messages shown in above-mentioned TABLE 2, TABLE 4 and TABLE 7. Or a dedicated message with a message format similar to those shown in TABLE 2, TABLE 4 and TABLE 7 set by the setting sub-unit 410 bears the load-adjustment factors, or a dedicated message as shown in TABLE 8 set by the setting sub-unit 410 bears the load-adjustment factors.

As shown in FIG. 5, according to the present invention, the notifying unit 41 further comprises an obtaining sub-unit 413, which is configured to obtain the load-adjustment factors of the neighbor sectors of the current serving sector of the user terminal, and sends them to the user terminal by the sending sub-unit 412.

Those skilled in the art should appreciate that, the implementation function of each processing unit and processing sub-unit of the apparatus for notifying the load-adjustment factor shown in FIG. 4 may be understood by referring to the above relevant description of each step in FIG. 1, and the function of each unit and module may be implemented by a programmer running on the processer, or may be implemented by a corresponding logic circuit.

Figure 6:
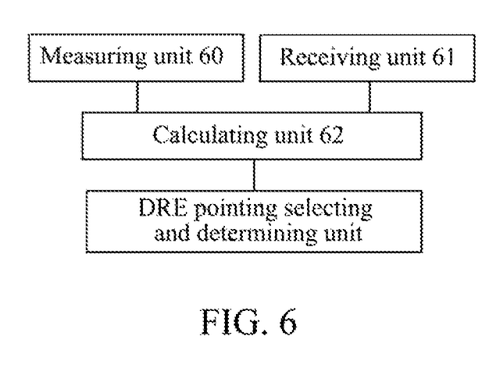
FIG. 6 is a schematic diagram of the structure of an apparatus for selecting and determining pointing of a data rate control according to the present invention.

FIG. 6 is a schematic diagram of the structure of an apparatus for selecting and determining pointing of a data rate control according to the present invention. As shown in FIG. 6, the apparatus for selecting and determining pointing of the data rate control according to the present invention comprises a measuring unit 60, a receiving unit 61, a calculating unit 62 and a DRC pointing selecting and determining unit 63, wherein, the measuring unit 60 is configured to measure a signal measurement strength of the sector when the user terminal is selecting and determining the DRC pointing; the receiving unit 61 is configured to receive the load-adjustment factor of the sector distributed by the base station; the calculating unit 62 is configured to deduct the load-adjustment factor of the sector received by the receiving unit 61 from the signal measurement strength of the sector measured by the measuring unit 60; the DRC pointing selecting and determining unit 63 is configure to determine whether the DRC points towards the sector according to the signal measurement strength after the deduction performed by the calculating unit 62. Wherein, the receiving unit 61 receives the load-adjustment factor of the sector by a dedicated message or an extended existing system message; the extended existing system message comprises: a SectorParameter message, a NeighborList message or an OtherRATNeighbroList message, and an information unit bearing the load-adjustment factor is set in the SectorParameter message, NeighborList message or the OtherRATNeighbroList message.

Those skilled in the art should appreciate that, the implementation function of each processing unit the apparatus for selecting and determining pointing of the data rate control shown in FIG. 6 may be understood by referring to the above relevant description of each step in FIG. 2, and the function of each unit may be implemented by a programmer running on the processer, or may be implemented by a corresponding logic circuit.

Figure 7:
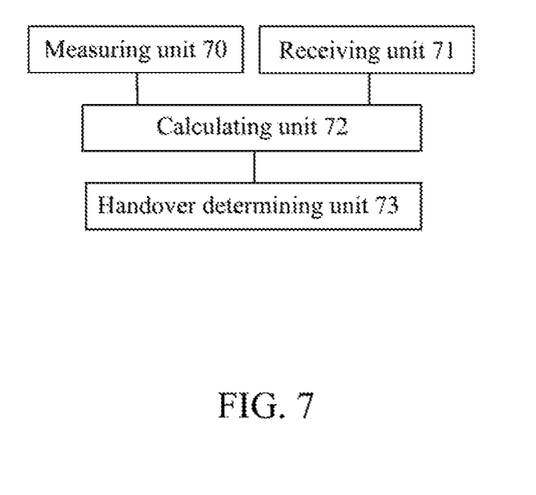
FIG. 7 is a schematic diagram of the structure of an apparatus for determining sector handover according to the present invention.

FIG. 7 is a schematic diagram of the structure of an apparatus for determining sector handover according to the present invention. As shown in FIG. 7, the apparatus for determining sector handover according to the present invention comprises a measuring unit 70, a receiving unit 71, a calculating unit 72 and a handover determining unit 73, wherein, the measuring unit 70 is configured to measure a signal measurement strength of the sector when the user terminal is determining sector handover, the receiving unit 71 is configured to receive the load-adjustment factor of the sector distributed by the base station; the calculating unit 72 is configured to deduct the load-adjustment factor of the sector received by the receiving unit 71 from the signal measurement strength of the sector measured by the measuring unit 70, or add the handover-add or handover-drop threshold used by the sector to the load-adjustment factor of the sector received by the receiving unit 71; the handover determining unit 73 is configure to determine whether to handover-add or the handover-drop the sector according to the signal measurement strength resulted from the deduction or the handover-add or handover-drop threshold resulted from the addition performed by the calculating unit 72. Wherein, the receiving unit 71 receives the load-adjustment factor of the sector by a dedicated message or an extended existing system message; the extended existing system message comprises: a SectorParameter message, a NeighborList message or an OtherRATNeighbroList message, and an information unit bearing the load-adjustment factor is set in the SectorParameter message, NeighborList message or the OtherRATNeighbroList message.

Those skilled in the art should appreciate that, the implementation function of each processing unit of the apparatus for determining sector handover shown in FIG. 7 may be understood by referring to the above relevant description of each step in FIG. 3, and the function of each unit may be implemented by a programmer running on the processer, or may be implemented by a corresponding logic circuit.

What are described above are only preferred embodiments of the present invention, but not used to limit the protection scope of the present invention.

What is claimed is:

1. A method for notifying load-adjustment factors, comprising:
a base station setting a load-adjustment factor of a sector; and
the base station notifying one or more user terminals of the load-adjustment factor of the sector and one or more load-adjustment factors of one or more neighbor sectors of the sector, the load-adjustment factor is a value expressed in terms of signal strength;
wherein the step of the base station setting the load-adjustment factor specifically comprises:
the base station dynamically setting a value of the load-adjustment factor of the sector according to a difference value between a current link load and/or system load of the sector and a corresponding target load, wherein, the larger the difference value is, the greater the set load-adjustment factor is; or,
once the current link load and/or system load exceeds the target load, setting a determined load-adjustment factor; wherein, when the current link load and system load are both lower than the target load, the load-adjustment factor is 0.

2. The method according to claim 1, wherein, the step of notifying the one or more user terminals specifically comprises:
setting a dedicated message for the load-adjustment factor of the sector and the one or more load-adjustment factors of the one or more neighbor sectors of the sector, and notifying the one or more user terminals by a control channel or a dedicated channel.

3. The method according to claim 1, wherein, the step of notifying the one or more user terminals specifically comprises:
setting an information unit bearing the load-adjustment factor of the sector and the one or more load-adjustment factors of the one or more neighbor sectors of the sector in one of the existing system messages, and notifying the one or more user terminals with the existing system message.

4. The method according to claim 3, wherein, the existing system message comprises a sector overhead (SectorParameter) message, a neighbor sector list (NeighborList) message or a different system neighbor sector information (OtherRAT-NeighborList) message.

5. A method for determining sector handover, comprising:
when selecting whether to handover-add or handover-drop a sector,
a user terminal adding a handover-add or handover-drop threshold used by the sector to the received load-adjustment factor of the sector distributed by the base station;
the user terminal determining whether to handover-add or handover-drop the sector according to the handover-add or handover-drop threshold resulted from the addition.

6. The method according to claim 5, wherein, the user terminal receives the load-adjustment factor of the sector by a dedicated message or an extended existing system message.

7. The method according to claim 5, wherein, the extended existing system message comprises: a SectorParameter message, a NeighborList message or an OtherRATNeighbroList message; wherein, an information unit bearing the load-adjustment factor is set in the SectorParameter message, the NeighborList message or the OtherRATNeighbroList message.

8. An apparatus for notifying load-adjustment factors of one or more sectors, comprising a setting unit a notifying unit, wherein,
the setting unit is configured to set a load-adjustment factor of a sector;
the notifying unit is configured to notify one or more user terminals of the load-adjustment factor of the sector and one or more load-adjustment factors of one or more neighbor sectors of the sector, wherein the load-adjustment factor is a value expressed in terms of signal strength;
wherein the setting unit further dynamically sets a value of the load-adjustment factor of the sector according to a difference value between a current link load and/or system load of the sector and a corresponding target load, wherein, the larger the difference value is, the greater the value of load-adjustment factor is; or,
once the current link load and/or system load exceeds the target load, a determined load-adjustment factor is set; wherein, when the current link load and system load both are both lower than the target load, the load-adjustment factor is 0.

9. The apparatus according to claim 8, wherein, the notifying unit further comprises a setting sub-unit, a bearing sub-unit and a sending sub-unit, wherein,
the setting sub-unit is configured to set a dedicated message of the load-adjustment factor of the sector and the one or more load-adjustment factors of the one or more neighbor sectors of the sector, or set an information unit for bearing the load-adjustment factor of the sector and the one or more load-adjustment factors of the one or more neighbor sectors of the sector in an existing system message;
the bearing sub-unit is configured to make the dedicated message or the information unit of the existing system message bear the load-adjustment factor of the sector and the one or more load-adjustment factors of the one or more neighbor sectors of the sector;
the sending sub-unit is configured to send to the one or more user terminals the dedicated message or the existing system message that bears the load-adjustment factor of the sector and the one or more load-adjustment factors of the one or more neighbor sectors of the sector.

10. The apparatus according to claim 8, wherein, the notifying unit further comprises an obtaining sub-unit, which is configured to obtain the one or more load-adjustment factors of one or more neighbor sectors of the sector.

* * * * *